United States Patent
Nicholson

[11] Patent Number: 6,158,933
[45] Date of Patent: Dec. 12, 2000

[54] DIRT CAP DEVICE FOR VISUALLY INDICATING ROTATION OF A FASTENER AND FOR KEEPING THE FASTENER CLEAN

[76] Inventor: Orv Nicholson, P.O. Box 12748, Salem, Oreg. 97309-0748

[21] Appl. No.: 09/476,168

[22] Filed: Dec. 30, 1999

[51] Int. Cl.[7] .................................................. F16B 13/02
[52] U.S. Cl. .......................... 411/14; 411/429; 411/377; 411/121; 116/200; 116/DIG. 1
[58] Field of Search .................... 411/429, 377, 411/373, 377.5, 372.6, 121, 119, 14, 8; 116/200, 201, 208, DIG. 1

[56] References Cited

U.S. PATENT DOCUMENTS

| | | |
|---|---|---|
| 2,370,944 | 3/1945 | Emerson . |
| 2,407,928 | 9/1946 | Herreshoff ............................. 411/373 |
| 4,050,494 | 9/1977 | de Claire . |
| 4,284,114 | 8/1981 | Korenobu . |
| 4,709,654 | 12/1987 | Smith . |
| 4,734,001 | 3/1988 | Bennett . |
| 4,781,502 | 11/1988 | Kushnick . |
| 4,906,150 | 3/1990 | Bennett . |
| 4,907,929 | 3/1990 | Johnston ................................ 411/377 |
| 4,930,951 | 6/1990 | Gilliam . |
| 5,017,068 | 5/1991 | Cooksey .................................. 411/373 |
| 5,120,174 | 6/1992 | Patti . |
| 5,199,835 | 4/1993 | Turner . |
| 5,472,302 | 12/1995 | Yandle, II . |

FOREIGN PATENT DOCUMENTS

| | | |
|---|---|---|
| 517186 | 12/1954 | Belgium . |
| 2242720 | 10/1991 | United Kingdom ..................... 411/14 |

*Primary Examiner*—Flemming Saether
*Attorney, Agent, or Firm*—Richard L. Miller

[57] ABSTRACT

A diet cap device for visually indicating rotation of a fastener and for keeping the fastener clean. The device includes a base and a receptacle. The base has a central portion that is circular-shape and has a circumference and a extended diameter that extends past the circumference and an extended diameter that extends past the circumference thereof. The receptacle is disposed on the base and receives the fastener and includes a collar that is concentrically disposed on the central portion of the base and spaces the base away from direct contact with a wheel and a cap that is concentrically disposed on the central portion of the vase, opposes, and is coaxial with, the collar and cover and protects the fastener from dirt.

5 Claims, 1 Drawing Sheet

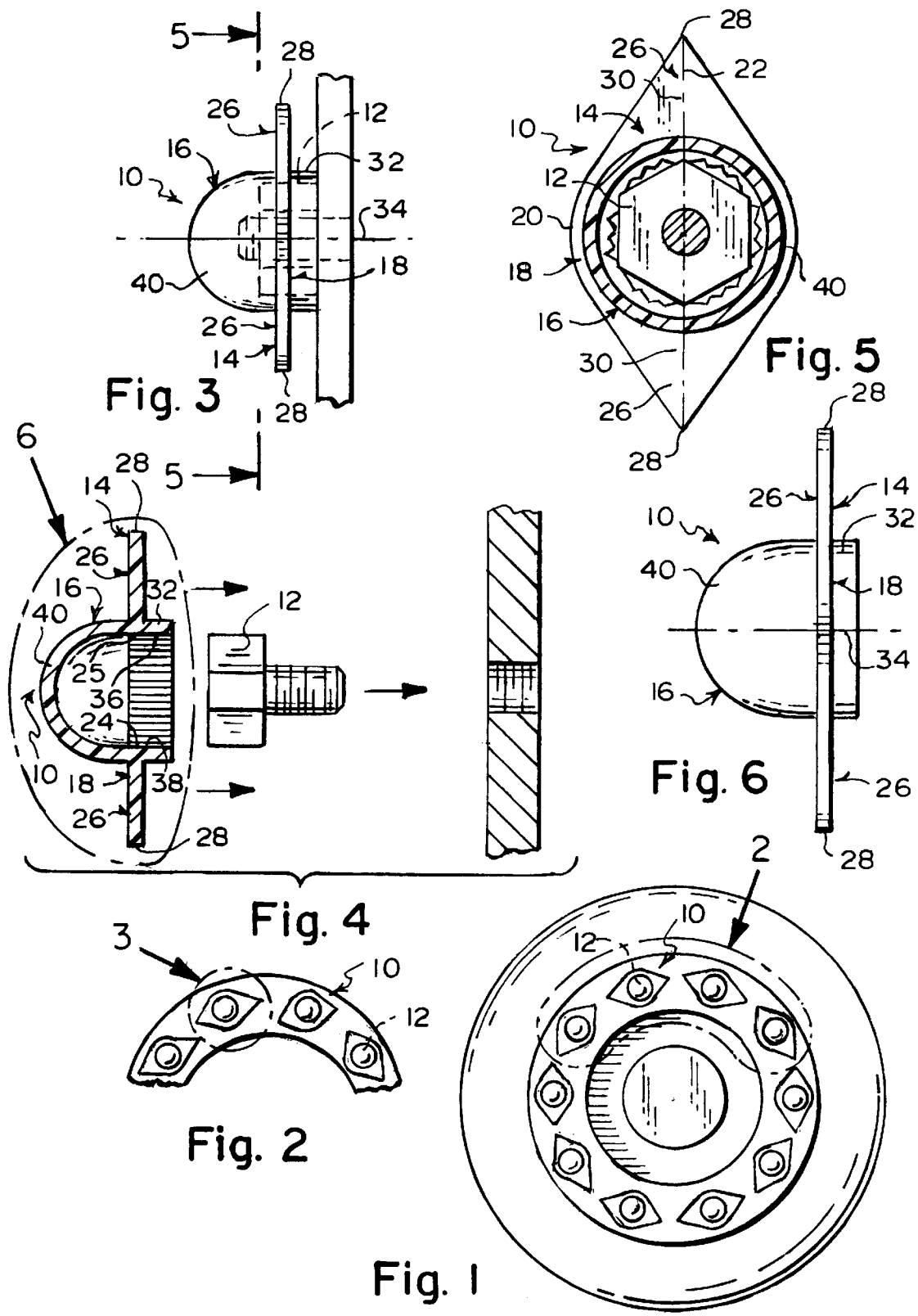

DIRT CAP DEVICE FOR VISUALLY INDICATING ROTATION OF A FASTENER AND FOR KEEPING THE FASTENER CLEAN

BACKGROUND OF THE INVENTION

1. Field of the Invention

The present invention relates to a device for indicating rotation of a fastener. More particularly, the present invention relates to a dirt cap device for visually indicating rotation of a fastener and for keeping the fastener clean.

2. Description of the Prior Art

Numerous innovations for fastener related devices have been provided in the prior art that will be described. Even though these innovations may be suitable for the specific individual purposes to Which they address, however, they differ from the present invention.

A FIRST EXAMPLE, U.S. Pat. No. 4,709,654 to Smith teaches a device for indicating when a lug nut has come loose on an automobile wheel. In one embodiment, the device operates by detecting relative movement between the lug nut and the axle stud on which it is mounted. In a second embodiment, the detected relative movement is between the lug nut and the wheel itself. In the preferred embodiment, the device has a first member with an open-ended channel and second and third members slidably received in it. The second member operates in cooperation with the sides of the channel and one of the springs to hold the third member in a retracted or cocked position when the lug nut is in its preferred, tight position against the wheel. Thereafter, should the lug nut come loose and move relative to the stud, the second member will follow or move under the force of its spring outwardly to maintain contact with the free end of the stud. In doing so, the third or indicator member is released to move in the opposition direction under the force of its spring to protrude beyond the outer surface of the lug nut where it can be easily and quickly seen or felt by hand. In the second embodiment, the second or follower member abuts the wheel itself rather than the free end of the stud but otherwise operates in the same manner.

A SECOND EXAMPLE, U.S. Pat. No. 4,781,502 to Kushnick teaches an anti-rotation locking device for threaded fasteners which secure rotating parts subject to vibration, shock and the like. The device comprises a strap member and one or more retainer members. The strap member is positioned under the fasteners and the retainer members each have a toothed opening which is installed over the matching wrenching surface of the fastener. Each retainer member also has an arcuate slot which is positioned above an arcuate tang on the strap member. The tang is lifted, passed through the slot, bent about the bottom of the slot and folded back over the top surface of the retainer member to thereby restrain the loosening of the fastener.

A THIRD EXAMPLE, U.S. Pat. No. 5,120,174 to Patti teaches a warning device for indicating undesired rotation of a threaded nut on a non-rotatable threaded shaft that includes a tight fitting shell for covering the nut and a manually rotatable highly visible indicator on the end of the shell to be adjusted to a predetermined initial alignment. Any torque change caused by nut rotation will therefore rotate the indicator from its predetermined alignment.

A FOURTH EXAMPLE, U.S. Pat. No. 5,472,302 to Yandle, II teaches a bolt that includes a movable pin in the center thereof. This pin can freely move up and down in the bolt. If the pin protrudes out of bolt a predetermined distance after the bolt is screwed into a blind bolt hole, then an inspector knows that the bolt is fully engaged. If, on the other hand, the bolt is not fully engaged, the pin will not protrude the predetermined distance out of the bolt. A second embodiment of the similar invention is a stud having an indicator pin. In third and fourth embodiments, the bolts and studs have indicator pins including grease zerks. These grease zerks allow the holes to be filled with grease to prevent damage to the hole due to corrosion.

It is apparent that numerous innovations for fastener related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a dirt cap device for visually indicating rotation of a fastener and for keeping the fastener clean that avoids the disadvantages of the prior art.

ANOTHER OBJECT of the present invention is to provide a dirt cap device for visually indicating rotation of a fastener and for keeping the fastener clean that is simple and inexpensive to manufacture.

STILL ANOTHER OBJECT of the present invention is to provide a cap dirt device for visually indicating rotation of a fastener and for keeping the fastener clean that is simple to use.

BRIEFLY STATED, YET ANOTHER OBJECT of the present invention is to provide a dirt cap device for visually indicating rotation of a fastener and for keeping the fastener clean. The device includes a base and a receptacle. The base has a central portion that is circular-shaped and has a circumference and an extended diameter that extends past the circumference thereof. The receptacle is disposed on the base and receives the fastener and includes a collar that is concentrically disposed on the central portion of the base and spaces the base away from direct contact with a wheel and a cap that is concentrically disposed on the central portion of the base, opposes, and is coaxial with, the collar and covers and protects the fastener from dirt.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic elevational view of the present invention installed on a wheel prior to use;

FIG. 2 is a diagrammatic elevational view of the present invention installed on a wheel after use;

FIG. 3 is an enlarged diagrammatic side elevational view of the area generally enclosed by the dotted curve identified by arrow 3 in FIG. 2 of the present invention installed on a wheel;

FIG. 4 is an exploded diagrammatic side elevational view of the present invention shown in FIG. 3;

FIG. 5 is a diagrammatic cross sectional view taken on line 5—5 in FIG. 3; and

FIG. 6 is an enlarged diagrammatic side elevational view of the area generally enclosed in the dotted curve identified by arrow 6 in FIG. 4 of the present invention.

LIST OF REFERENCE NUMERALS UTILIZED IN THE DRAWING 10 dirt cap device for visually indicating rotation of a fastener and for keeping the fastener clean of the present invention
12 fastener
14 base
16 receptacle for receiving fastener 12
18 central portion of base 14
20 circumference of central portion 18 of base 14
22 extended diameter of central portion 18 of base 14
24 throughbore in central portion 18 of base 14 for receiving fastener 12
25 perimeter of throughbore 24 in central portion 18 of base 14 for engaging fastener 12
26 pair of wing portions of base 14
28 pointed apexes of pair of wing portions 26 of base 14
30 altitudes of pair of wing portions 26 of base 14
32 collar of receptacle 16 for space base 14 away from the wheel
34 longitudinal centerline of collar 32 of receptacle 16
36 throughbore in collar 32 of receptacle 16
38 perimeter of throughbore 36 in collar 32 for engaging fastener 12
40 cap of receptacle 16 for covering and protecting fastener 12 from dirt

DETAILED DESCRIPTION OF THE PREFERRED EMBODIMENT

Referring now to the figures, in which like numerals indicate like parts, and particularly to FIGS. 1 and 2, the dirt cap device of the present invention is generally shown at 10 for visually indicating rotation of a fastener 12 and for keeping the fastener 12 clean.

The configuration of the dirt cap device 10 can best be seen in FIGS. 3–6, and as such, will be discussed with reference thereto.

The dirt cap device 10 comprises a base 14 and a receptacle 16 disposed on the base 14 for receiving the fastener 12.

The base 14 is flat, thin, and made of a resilient material.

The base 14 has a central portion 18 that is circular-shaped and has a circumference 20 and an extended diameter 22 that extends past the circumference thereof.

The central portion 18 of the base 14 has a throughbore 24 that extends concentrically therethrough for receiving the fastener 12.

The throughbore 24 in the central portion 18 of the base 14 is defined by a perimeter 25 that is serrated in a circular pattern for compressingly engaging the fastener 12.

The base 14 further has a pair of wing portions 26 that are thin, flat, and isosceles triangular-shaped, and have pointed apexes 28 and altitudes 30.

The pair of wing portions 26 of the base 14 extend integrally and coplanarly from diametrically opposing sides of the circumference 20 of the central portion 18 of the base 14, with their pointed apexes 28 pointing outwardly and with their altitudes 30 lying on the extended diameter 22 of the central portion 18 of the base 14.

The receptacle 16 comprises a collar 32 that is concentrically disposed on the central portion 18 of the base 14 for spacing the base 14 away from direct contact with the wheel.

The collar 32 is cylindrically-shaped, shallow, and made of la resilient material integrally with the base 14.

The collar 32 has a longitudinal centerline 34 and a throughbore 36 that extends coaxially along the longitudinal centerline 34 thereof.

The throughbore 36 in the collar 32 is defined by a perimeter 38 that is serrated in a circular pattern for compressingly engaging the fastener 12, and whose serrations are aligned with corresponding serrations of the perimeter 25 of the throughbore 24 in the central portion 18 of the base 14, with the serrations of the perimeters 25 and 36 of the throughbores 24 and 38 in the base 14 and the collar 32, respectively, lockingly engaging the fastener 12, and as shown in FIG. 5, when the fastener 12 rotates, the pair of wing portions 26 of the base 14 also rotate and become displaced indicating that the fastener 12 has rotated.

The receptacle 16 further comprises a cap 40 that is concentrically disposed on the central portion 18 of the base 14, opposing, and being coaxial with, the collar 32 for covering and protecting the fastener 12 from dirt.

The cap 40 is hemispherically-shaped, hollow, shallow, and made of a resilient material integrally with the base 14.

It will be understood that each of the elements described above, or two or more together, may also find a useful application in other types of constructions differing from the types described above.

While the invention has been illustrated and described as embodied in a dirt cap device for visually indicating rotation of a fastener and for keeping the fastener clean, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A dirt cap device for visually indicating rotation of a fastener and for keeping the fastener clean, comprising:
    a) a base having a central portion being circular-shaped and having:
        i) a circumference; and
        ii) an extended diameter extending past said circumference thereof; and
    b) a receptacle disposed on said base for receiving the fastener and comprising:
        i) a collar being concentrically disposed on said central portion of said base for spacing said base away from direct contact with a wheel; and
        ii) a cap being concentrically disposed on said central Portion of said base, opposing, and being coaxial with, said collar for covering and protecting the fastener from dirt, wherein said base further has a pair of wing portions that are thin, flat, and isosceles triangular-shaped, and have;

A) pointed apexes; and
B) altitudes, wherein said collar has:
   I) a longitudinal centerline; and
   II) a throuohbore that extends coaxially along said longitudinal centerline thereof, wherein said throughbore in said collar is defined by a perimeter that is serrated in a circular pattern for compressingly engaging the fastener, and whose serrations are aligned with corresponding serrations of said perimeter of said throughbore in said central portion of said base, with said serrations of said perimeters of said throughbores in said base and said collar, respectively, lockingly engaging the fastener, and when the fastener rotates, said pair of wing portions of said base also rotate and become displaced visually indicating that the fastener has rotated.

2. The device as defined in claim 1, wherein said base is flat, thin, and made of a resilient material.

3. The device as defined in claim 1, wherein said pair of wing portions of said base extend integrally and coplanarly from diametrically opposing sides of said circumference of said central portion of said base, with their pointed apexes pointing outwardly and with their altitudes lying on said extended diameter of said central portion of said base.

4. The device as defined in claim 1, wherein said collar is cylindrically-shaped, shallow, and made of a resilient material integrally with said base.

5. The device as defined in claim 1, wherein said cap is hemispherically-shaped, hollow, shallow, and made of a resilient material integrally with said base.

\* \* \* \* \*